United States Patent [19]

Lien

[11] Patent Number: 6,019,508
[45] Date of Patent: Feb. 1, 2000

[54] INTEGRATED TEMPERATURE SENSOR

[75] Inventor: Chiu-Feng Lien, Taipei, Taiwan

[73] Assignee: Motorola, Inc., Schaumburg, Ill.

[21] Appl. No.: 09/069,348

[22] Filed: Apr. 29, 1998

[30] Foreign Application Priority Data

Jun. 2, 1997 [SG] Singapore ............................... 9701859

[51] Int. Cl.$^7$ ....................................................... G01K 7/01
[52] U.S. Cl. ............................................ 374/178; 327/512
[58] Field of Search .................................. 374/178, 163; 327/102, 512, 103; 257/460

[56] References Cited

U.S. PATENT DOCUMENTS

| | | | |
|---|---|---|---|
| 3,812,717 | 5/1974 | Miller et al. | 374/178 |
| 5,195,827 | 3/1993 | Audi et al. | 374/178 |
| 5,546,041 | 8/1996 | Szajda | 327/512 |

OTHER PUBLICATIONS

"Micropower CMOS Temperature Sensor with Digital Output", Bakker et al., IEEE Journal of Solid–State Circuits. vol. 31, No. 7, Jul. 1996, pp. 933–937, 0018–9200(96)04470–8.

"A Low Noise, High Resolution Silicon Temperature Sensor", Szajda et al., IEEE Journal of Solid–State Circuits, vol. 31, No. 9, Sep. 1996, pp. 1308–1313, 0018–9200(96)06473–6.

*Primary Examiner*—Diego Gutierrez
*Assistant Examiner*—Gail Verbitsky
*Attorney, Agent, or Firm*—Rennie W. Dover

[57] ABSTRACT

An integrated temperature sensor circuit (9) comprises two different current sources (14 and 15) multiplexed using switches (12 and 13) controlled by Clocks 1 and 2 having opposite phases into a bipolar transistor 11. $V_{be}$ is developed on capacitor (23) during the first clock phase and $\Delta V_{be}$ is developed on capacitor (23) during the second clock phase. A second capacitor (27) is coupled between the input and output of an operational amplifier (25). The second capacitor (27) is discharged during the first clock phase and is charged during the second clock phase. Since $\Delta V_{be}$ is dependent on temperature, the voltage at the output of the operational amplifier (25) is dependent on the temperature and the ratio of the two capacitors.

14 Claims, 2 Drawing Sheets

INTEGRATED TEMPERATURE SENSOR

FIELD OF THE INVENTION

This invention relates to an integrated temperature sensor, and particularly, though not exclusively, to such a temperature sensor which can be manufactured in CMOS technology.

BACKGROUND OF THE INVENTION

Temperature sensors are used in a variety of applications, where it is necessary either to compensate for variations in temperature or to provide control when a particular temperature is reached. It is well known that the base-emitter voltage $V_{be}$ of a transistor varies linearly with temperature, as does the difference between two such voltages $\Delta V_{be}$. One known temperature sensor utilizing the variation in $\Delta V_{be}$ at different temperatures to provide an output indicative of the current temperature is described in "Micropower CMOS Temperature Sensor with Digital Output" by Anton Bakker and Johan H. Huijsing published in the IEEE Journal of Solid State Circuits, Vol. 31, No. 7, July 1996 at pages 933–937. The circuit basically consists of a pair of bipolar transistors having their bases in a fixed area ratio to each other. A known current is then passed through the two transistors to measure $\Delta V_{be}$ between them and thus get an indication of the temperature.

One problem with this type of circuit is that, although the transistors have their base areas nominally fixed at a particular ratio, manufacturing limitations mean that, in practice, the ratio is not the nominal one. Thus, the sensor requires calibration (trimming) at at least two different temperatures in order to set the gain and offset of the sensor correctly. This is time consuming and inconvenient.

BRIEF SUMMARY OF THE INVENTION

The present invention therefore seeks to provide an integrated temperature sensor which overcomes, or at least reduces the above-mentioned problems of the prior art.

Accordingly, in a first aspect, the invention provides an integrated temperature sensor comprising: a first bipolar transistor having a control electrode, a first current electrode coupled to the control electrode and to a reference potential and a second current electrode; a first current source providing a first current and being coupled via a first switch to the second current electrode of the first transistor; a second current source providing a second current and being coupled via a second switch to the second current electrode of the first transistor; an amplifier circuit having an input and an output; a coupling capacitor coupled between the second current electrode of the first transistor and the input of the amplifier circuit; a first clock input coupled to the first switch for receiving a first clock signal for switching the first current source to the second current electrode of the first transistor during a first clock phase; and a second clock input coupled to the second switch for receiving a second clock signal for switching the second current source to the second current electrode of the first transistor during a second clock phase which is substantially opposite to the first clock phase; wherein the amplifier circuit produces a signal at its output dependent on the difference in voltage on the coupling capacitor during the two clock phases and hence indicative of the temperature.

In a preferred embodiment, the amplifier circuit comprises an operational amplifier having a second input coupled to a reference potential and a second capacitor coupled between the input and the output of the operational amplifier, wherein the signal at the output of the operational amplifier is transferred to the input of the operational amplifier during the first clock phase to discharge the second capacitor and, during the second clock phase, the voltage on the coupling capacitor causes a voltage to develop on the second capacitor such that the output of the operational amplifier is dependent on the temperature and on the ratio of the capacitances of the coupling capacitor and the second capacitor.

According to one embodiment, the integrated temperature sensor further comprises a: a second bipolar transistor having a control electrode coupled to the coupling capacitor, a first current electrode coupled to a reference potential and a second current electrode; a third current source providing a third current and being coupled via a third switch to the second current electrode of the second bipolar transistor; a fourth current source providing a fourth current and being coupled via a fourth switch to the second current electrode of the second bipolar transistor; a fourth clock input coupled to the third switch for receiving the first clock signal for switching the third current source to the second current electrode of the second bipolar transistor during the first clock phase; and a fifth clock input coupled to the fourth switch for receiving the second clock signal for switching the fourth current source to the second current electrode of the second bipolar transistor during the second clock phase, wherein a compensation current is produced at the control electrode of the second bipolar transistor.

Preferably, the second bipolar transistor is substantially matched to the first transistor and the third and fourth current sources are substantially identical to the first and second current sources, respectively.

In a second aspect, the invention provides a method of sensing temperature comprising the steps of:

switching a first current to the emitter of a bipolar transistor during a first clock phase;

switching a second current to the emitter of the bipolar transistor during a second clock phase which is substantially opposite to the first clock phase;

charging a coupling capacitor during each of the clock phases according to the base-emitter voltage across the transistor caused by the first and second currents;

transferring the charge from the coupling capacitor to an amplifier circuit to produce a signal dependent on the difference in base-emitter voltages on the coupling capacitor, and hence dependent on the temperature.

Preferably, the amplifier circuit comprises an operational amplifier having a second capacitor coupled between an input and an output thereof, and the step of transferring the charge from the coupling capacitor comprises the steps of:

shorting the second capacitor during the first clock phase; and developing a voltage on the second capacitor during the second clock phase, such that the output of the operational amplifier during the second clock phase is dependent on the temperature and the ratio of the capacitances of the two capacitors.

BRIEF DESCRIPTION OF THE DRAWINGS

One embodiment of the invention will now be more fully described, by way of example, with reference to the drawings, of which.

DETAILED DESCRIPTION OF THE DRAWINGS

Figure 1:
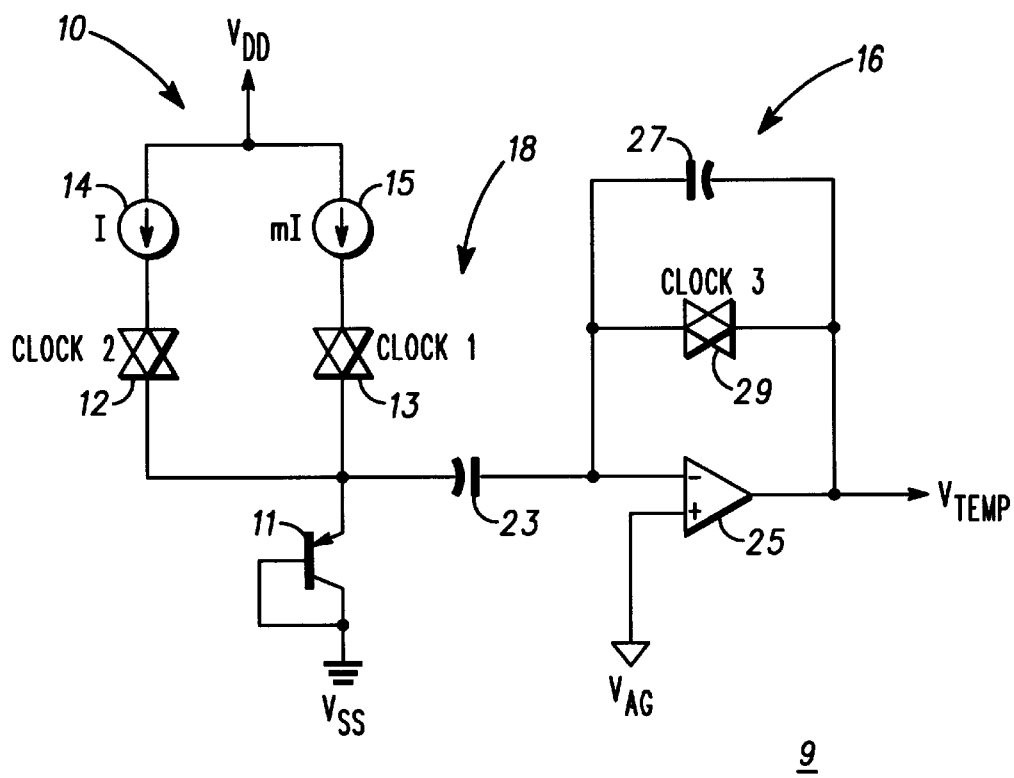
FIG. 1 shows a schematic block diagram of one embodiment of a temperature sensor according to the invention.

Thus, there is shown in FIG. 1 a switched capacitor temperature sensor circuit 9 in accordance with an embodiment of the present invention. In general, temperature sensor circuit 9 comprises a $\Delta V_{be}$ reference portion 10, a coupling portion 18, and an amplifier portion 16. The $\Delta V_{be}$ reference portion 10 is formed by a single bipolar transistor 11, switches 12 and 13, and current sources 14 and 15. In the illustrated embodiment, all the switches are constructed to be conductive when the clocks are in a logical high state.

In the $\Delta V_{be}$ reference portion 10, current sources 14 and 15 each have a first terminal coupled to a first terminal of the respective switch 12 and 13 and a second terminal connected to a first power supply line Vdd. The current sources 14 and 15 are constructed to have different values of current sourcing capability, I and mI, respectively, where m is any number. Switches 12 and 13 also have clock terminals, which are respectively controlled by clock signals designated as "Clock 2" and "Clock 1". Second terminals of the switches 12 and 13 are connected together and to an emitter of the single bipolar transistor 11. The single bipolar transistor 11 has a base and a collector connected together and to a second power supply line Vss. In the illustrated embodiment, the first power supply line Vdd is at a more positive voltage than the second power supply line Vss.

In coupling portion 18 a capacitor 23 has a first electrode connected to the emitter of bipolar transistor 11 and a second electrode connected to the amplifier portion 16.

The amplifier portion 16 of the temperature sensor circuit 9 comprises a differential amplifier 25 having a negative input connected to the second electrode of capacitor 23. A positive input of the differential amplifier 25 is connected to an analog ground voltage terminal Vag. In the illustrated embodiment, the analog ground voltage terminal Vag has a voltage potential about halfway between that of the first and second power supply lines Vdd and Vss.

A capacitor 27 has a first electrode connected to the negative input of differential amplifier 25 and a second electrode connected to an output of the differential amplifier 25, which provides an output voltage Vtemp. A switch 29 has a first terminal connected to the negative input of differential amplifier 25 and a second terminal connected to the output of differential amplifier 25. Switch 29 also has a control terminal for receiving a clock signal designated "Clock 3".

Figure 2:
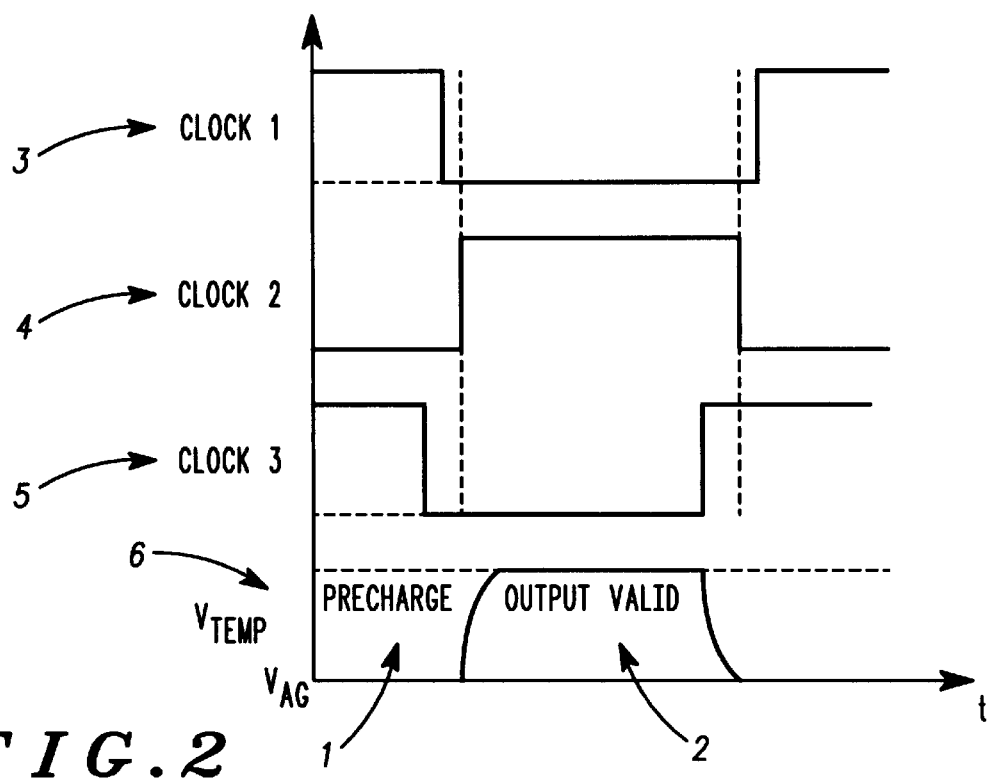
FIG. 2 shows timing signals and voltages for the embodiment of FIG. 1.

In operation, temperature sensor circuit 9 operates in two repeating modes: a precharge mode 1, and a valid output mode 2. Control signals illustrating the two modes are shown in FIG. 2. During the precharge mode 1, clock 1 is high, as shown in waveform 3, so that switch 13 couples current source 15 to the emitter of the bipolar transistor 11 establishing a voltage $V_{be1}$ at the emitter of bipolar transistor 11 which is dependent on the current through the collector of the bipolar transistor 11. At this time, clock 3, shown in waveform 5, is also high, so that switch 29 is on, thereby connecting the output of differential amplifier 25 to its negative input, as well as connecting the electrodes of capacitor 27 together to discharge capacitor 27. Therefore, during the precharge period the first temperature dependent voltage $V_{be1}$ is sampled onto capacitor 23, which is at $V_{be1}$-Vag.

Just before the end of the precharge period Clock 3 goes to a logical low state so that capacitor 27 is no longer being discharged. Then, at the end of the precharge period Clock 1 goes to a logical low state, thereby disconnecting current source 15 from the transistor 11. A short time after clock 1 has gone to a logical low state, the valid output mode begins. In this mode, clock 2, shown in waveform 4, transits to a logical high state so that current source 14 is coupled through switch 12 to the emitter of bipolar transistor 11. Since current source 14 is of different value than current source 15, the current through bipolar transistor 11 is different than in the precharge mode and will result in a different $V_{be}$ voltage $V_{be2}$ at the emitter of bipolar transistor 11. Thus, when clock 2 is high, the voltage on capacitor 23 is $V_{be2}$-Vag. As a result of this switching action, a $\Delta V_{be}$ voltage, which is defined as the voltage difference between $V_{be1}$ and $V_{be2}$ is developed by the $\Delta V_{be}$ reference portion 10 and coupling portion 18.

This developed $\Delta V_{be}$ voltage is coupled to capacitor 27 by means of charge transfer from capacitor 23, since the positive and negative inputs of amplifier 25 are at equal potential, both during Clock 1 high and Clock 2 high. The output voltage Vtemp of the differential amplifier 25, as shown by waveform 6 in FIG. 2, changes in accordance with the voltage division formed between the capacitance of capacitor 27 and the capacitance of capacitor 23. As will be clear to those skilled in the art, the $\Delta V_{be}$ will exhibit a voltage change that is proportional to absolute temperature (PTAT). The output voltage Vtemp is therefore given by the equation:

$$\text{Vtemp}=[C/A*C]*\{\Delta V_{be}+R_b*(mI/\beta_2-I/\beta_{62})+(K*T/q)*1n[(1+1/\beta_1)/(1+1/\beta_2)]\} \quad (1)$$

where A is the capacitive ratio of capacitors 23 and 27;
C is the capacitance value of capacitor 23;
$R_b$ is the intrinsic base resistance of transistor 11; and
$\beta_1$ and $\beta_2$ are the current gains of transistor 11 at current levels I and mI, respectively.

The expression for $\Delta V_{be}$ is:

$$\Delta V_{be}=(K*T/q)*1n(m) \quad (2)$$

where K is the Boltzmann constant;
T is the absolute temperature; and
q is the electronic charge; and
m is the current ratio between current source 15 and current source 14.

By combining equations (1) and (2), the Vtemp dependancy on absolute temperature, including offset error terms, is shown to be:

$$\text{Vtemp}=(1/A)*\{T*[K/q]*1n(m)+R_b*(mI/\beta_2-I/\beta_1)+(K*T/q)*1n[(1+1/\beta_1)/(1+1/\beta_2)]\} \quad (3)$$

Thus, by time multiplexing a single bipolar transistor in circuit 9 to generate a $\Delta V_{be}$ for sensing temperature, a significant source of error inherent in other temperature sensors usina $\Delta V_{be}$ voltage developed from two different bipolar transistors is eliminated.

The valid output phase ends with Clock 3 going high so as to put Vtemp onto the negative input of operational amplifier 25 so as to discharge capacitor 27. This is followed shortly by Clock 2 going low so that current source 14 is disconnected from transistor 11 just before Clock 1 goes high to connect current source 15 to transistor 11 in the precharge period.

The major source of error in equation (3) is found in the term:

$$R_b*(mI/\beta_2-I/\beta_1)$$

Figure 3:
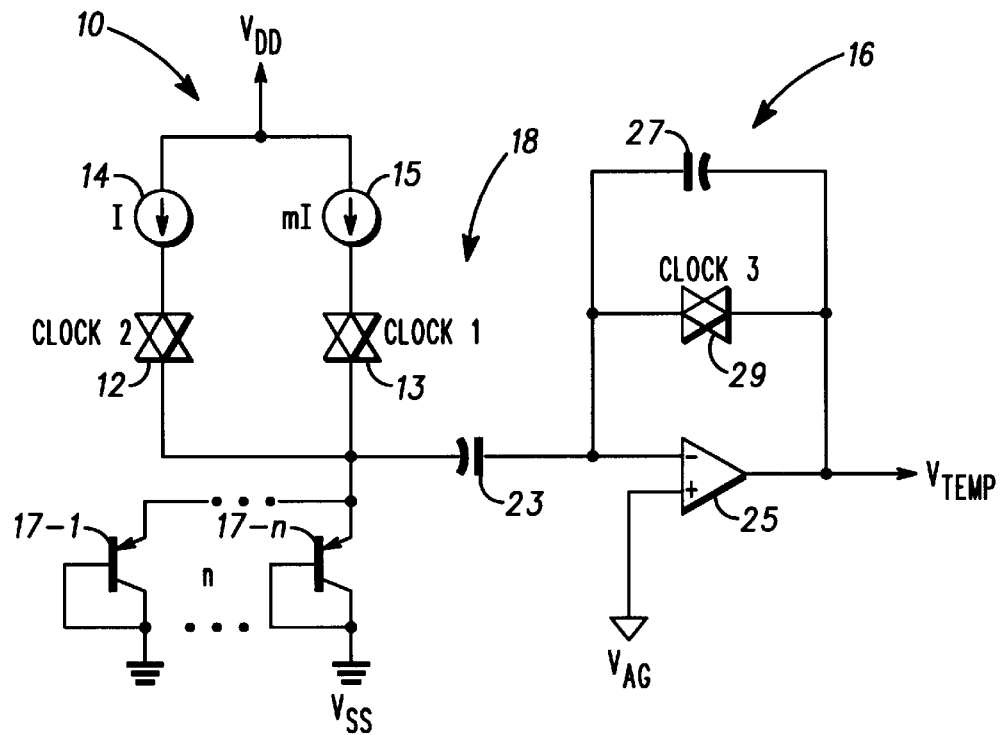
FIG. 3 shows a modification of the embodiment of FIG. 1.

This source of error can be minimized by minimizing $R_b$. This can be done by replacing transistor 11, as shown in FIG. 3, by a total number n of bipolar transistors 17 coupled in parallel. This reduces the current density of each transistor, and therefore reduces this offset error term.

Figure 4:
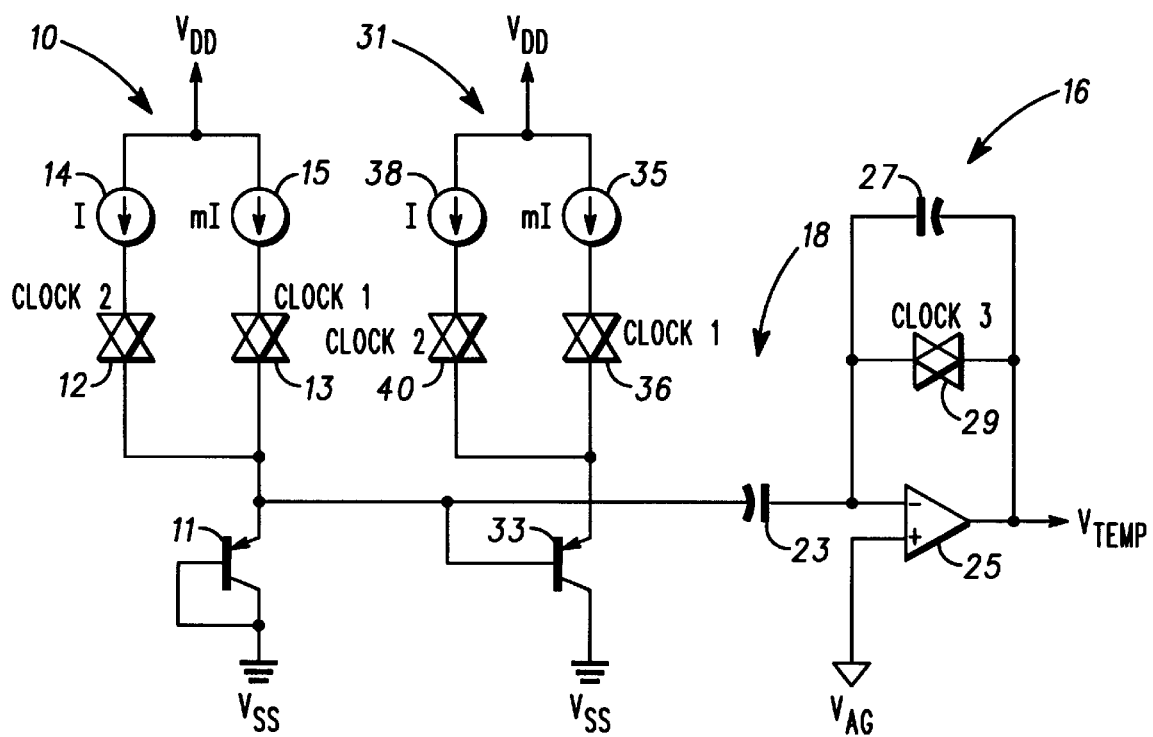
FIG. 4 shows schematic block diagram of a second embodiment of a temperature sensor according to the invention.

Illustrated in FIG. 4 is another embodiment of a temperature sensor circuit 19, modified from the temperature sensor circuit 9 of FIG. 1. In this embodiment, each of the elements that are the same as in FIG. 1 are given the same reference numeral. Circuit 19 also generates $\Delta V_{be}$ for sensing temperature, but utilizes an additional portion 31 in order to eliminate the error term:

$$(K*T/q)*1n[(1+1/\beta_1)/(1+1/\beta_2)]$$

in equation (3).

In operation, the additional portion 31 is used to generate a base current to compensate the generated $\Delta V_{be}$. This compensation base current is necessary in processes that have a low current gain (low β), which creates an offset voltage represented by the third term in equation (3). The portion 31 utilizes additional time-multiplexed current sources 35 and 38 coupled via additional switches 36 and 40, respectively, to an additional bipolar transistor 33. Switches 36 and 40 are controlled by Clocks 1 and 2, respectively, in the same way as switches 15 and 14. However, instead of the emitter of transistor 33 being coupled to the capacitor 23, as is the emitter of transistor 1, it is the base of transistor 33 that is coupled to the capacitor 23, instead of to the collector of transistor 33.

Thus, the collector current of transistor 11 is the sum of the currents from time-multiplexed current sources 14 and 15, as well as the base current of transistor 33. Assuming Clock 2 enables both switches 12 and 40 at the same time, the equation for the collector current of transistor 11 is therefore:

$$I_{c11}=I+I_{b33}-I_{b11} \quad (4)$$

If the transistors 11 and 33 are constructed with the same area and layout technique, and current sources 35 and 38 are equal to current sources 15 and 14, respectively, then the base current of transistor 33 will be approximately equal to the base current of transistor 11. Thus, equation (4) becomes:

$$I_{c11}=I \quad (5)$$

With the base current terms removed from equation (4), the effect of variations in β in transistor 11 is eliminated so as to eliminate the second error source in equation (3).

It will be appreciated that although only two particular embodiments of the invention have been described in detail, various modifications and improvements can be made by a person skilled in the art without departing from the scope of the present invention. For example, the bipolar transistor whose base is coupled to Vss could be connected to other reference voltages. Additional current sources and bipolar transistors can be added to achieve base current compensation for the $\Delta V_{be}$ voltage. Different base current compensation may be utilized. Another bipolar transistor could be used so as to increase the $V_{be1}$ voltage to reduce the capacitance of capacitor 23. Specific NPN bipolar transistors may be used instead of PNP bipolar transistors or combinations thereof. Also, amplifiers other than differential amplifiers may be used. Furthermore, of coupling the nodes other than using the illustrated switches may be implemented. It should also be understood that the elements of the present invention may be implemented using different types of transistors and/or transistors of different conductivities from those described above.

What I claim is:

1. An integrated temperature sensor comprising:

a first bipolar transistor having a control electrode, a first current electrode coupled to the control electrode and to a reference potential and a second current electrode;

a first current source providing a first current and being coupled via a first switch to the second current electrode of the first transistor;

a second current source providing a second current and being coupled via a second switch to the second current electrode of the first transistor;

an amplifier circuit having an input and an output;

a coupling capacitor coupled between the second current electrode of the first transistor and the input of the amplifier circuit;

a first clock input coupled to the first switch for receiving a first clock signal for switching the first current source to the second current electrode of the first transistor during a first clock phase; and a second clock input coupled to the second switch for receiving a second clock signal for switching the second current source to the second current electrode of the first transistor during a second clock phase which is substantially opposite to the first clock phase;

wherein the amplifier circuit produces a signal at its output dependent on the difference in voltage on the coupling capacitor during the two clock phases and hence indicative of the temperature.

2. An integrated temperature sensor according to claim 1, further comprising one or more further bipolar transistors coupled in parallel with the first bipolar transistor.

3. An integrated temperature sensor according to claim 2, wherein the amplifier circuit comprises an operational amplifier having a second input coupled to a reference potential.

4. An integrated temperature sensor according to claim 2, further comprising:

a second bipolar transistor having a control electrode coupled to the coupling capacitor, a first current electrode coupled to a reference potential and a second current electrode;

a third current source providing a third current and being coupled via a third switch to the second current electrode of the second bipolar transistor;

a fourth current source providing a fourth current and being coupled via a fourth switch to the second current electrode of the second bipolar transistor;

a fourth clock input coupled to the third switch for receiving the first clock signal for switching the third current source to the second current electrode of the second bipolar transistor during the first clock phase; and a fifth clock input coupled to the fourth switch for receiving the second clock signal for switching the fourth current source to the second current electrode of the second bipolar transistor during the second clock phase, wherein a compensation current is produced at the control electrode of the second bipolar transistor.

5. An integrated temperature sensor according to claim 1, wherein the amplifier circuit comprises an operational amplifier having a second input coupled to a reference potential.

6. An integrated temperature sensor according to claim 5, wherein the amplifier circuit further comprises a second capacitor coupled between the input and the output of the operational amplifier, wherein the signal at the output of the operational amplifier is transferred to the input of the operational amplifier during the first clock phase to discharge the second capacitor and, during the second clock phase, the voltage on the coupling capacitor causes a voltage to develop on the second capacitor such that the output of the operational amplifier is dependent on the temperature and on the ratio of the capacitances of the coupling capacitor and the second capacitor.

7. An integrated temperature sensor according to claim 6, wherein the amplifier circuit further comprises a third clock input coupled to a third switch coupled between the input and the output of the operational amplifier for receiving a third clock signal, wherein the third clock phase is substantially equal to the first clock phase, but slightly ahead thereof, such that the signal at the output of the operational amplifier is transferred to the input of the operational amplifier during the third clock phase to discharge the second capacitor and the voltage on the coupling capacitor during the second clock phase causes a voltage to develop on the second capacitor such that the output of the operational amplifier is dependent on the temperature and on the ratio of the capacitances of the coupling capacitor and the second capacitor.

8. An integrated temperature sensor according to claim 7, further comprising:
   a second bipolar transistor having a control electrode coupled to the coupling capacitor, a first current electrode coupled to a reference potential and a second current electrode;
   a third current source providing a third current and being coupled via a third switch to the second current electrode of the second bipolar transistor;
   a fourth current source providing a fourth current and being coupled via a fourth switch to the second current electrode of the second bipolar transistor;
   a fourth clock input coupled to the third switch for receiving the first clock signal for switching the third current source to the second current electrode of the second bipolar transistor during the first clock phase; and
   a fifth clock input coupled to the fourth switch for receiving the second clock signal for switching the fourth current source to the second current electrode of the second bipolar transistor during the second clock phase,
   wherein a compensation current is produced at the control electrode of the second bipolar transistor.

9. An integrated temperature sensor according to claim 6, further comprising:
   a second bipolar transistor having a control electrode coupled to the coupling capacitor, a first current electrode coupled to a reference potential and a second current electrode;
   a third current source providing a third current and being coupled via a third switch to the second current electrode of the second bipolar transistor;
   a fourth current source providing a fourth current and being coupled via a fourth switch to the second current electrode of the second bipolar transistor;
   a fourth clock input coupled to the third switch for receiving the first clock signal for switching the third current source to the second current electrode of the second bipolar transistor during the first clock phase; and
   a fifth clock input coupled to the fourth switch for receiving the second clock signal for switching the fourth current source to the second current electrode of the second bipolar transistor during the second clock phase,
   wherein a compensation current is produced at the control electrode of the second bipolar transistor.

10. An integrated temperature sensor according to claim 5, further comprising:
   a second bipolar transistor having a control electrode coupled to the coupling capacitor, a first current electrode coupled to a reference potential and a second current electrode;
   a third current source providing a third current and being coupled via a third switch to the second current electrode of the second bipolar transistor;
   a fourth current source providing a fourth current and being coupled via a fourth switch to the second current electrode of the second bipolar transistor;
   a fourth clock input coupled to the third switch for receiving the first clock signal for switching the third current source to the second current electrode of the second bipolar transistor during the first clock phase; and
   a fifth clock input coupled to the fourth switch for receiving the second clock signal for switching the fourth current source to the second current electrode of the second bipolar transistor during the second clock phase,
   wherein a compensation current is produced at the control electrode of the second bipolar transistor.

11. An integrated temperature sensor according to claim 1, further comprising:
   a second bipolar transistor having a control electrode coupled to the coupling capacitor, a first current electrode coupled to a reference potential and a second current electrode;
   a third current source providing a third current and being coupled via a third switch to the second current electrode of the second bipolar transistor;
   a fourth current source providing a fourth current and being coupled via a fourth switch to the second current electrode of the second bipolar transistor;
   a fourth clock input coupled to the third switch for receiving the first clock signal for switching the third current source to the second current electrode of the second bipolar transistor during the first clock phase; and
   a fifth clock input coupled to the fourth switch for receiving the second clock signal for switching the fourth current source to the second current electrode of the second bipolar transistor during the second clock phase,
   wherein a compensation current is produced at the control electrode of the second bipolar transistor.

12. An integrated temperature sensor according to claim 11, wherein the second bipolar transistor is substantially matched to the first transistor and the third and fourth current sources are substantially identical to the first and second current sources, respectively.

13. A method of sensing temperature comprising the steps of:

switching a first current to the emitter of a bipolar transistor during a first clock phase;

switching a second current to the emitter of the bipolar transistor during a second clock phase which is substantially opposite to the first clock phase;

charging a coupling capacitor during each of the clock phases according to the base-emitter voltage across the transistor caused by the first and second currents;

transferring the charge from the coupling capacitor to an amplifier circuit to produce a signal dependent on the difference in base-emitter voltages on the coupling capacitor, and hence dependent on the temperature.

14. A method of sensing temperature according to claim 13, wherein the amplifier circuit comprises an operational amplifier having a second capacitor coupled between an input and an output thereof, and the step of transferring the charge from the coupling capacitor comprises the steps of:

shorting the second capacitor during the first clock phase; and developing a voltage on the second capacitor during the second clock phase, such that the output of the operational amplifier during the second clock phase is dependent on the temperature and the ratio of the capacitances of the two capacitors.

* * * * *